(12) United States Patent
Kim et al.

(10) Patent No.: US 10,883,017 B2
(45) Date of Patent: Jan. 5, 2021

(54) COATING COMPOSITION FOR A SILICONE RUBBER WIPER BLADE AND SILICONE RUBBER WIPER BLADE USING THE SAME

(71) Applicant: CAP CORPORATION, Gyeongsangbuk-do (KR)

(72) Inventors: Ki-Young Kim, Gyongsangbuk-do (KR); Jong-Yuen Kim, Gyongsangbuk-do (KR)

(73) Assignee: CAP CORPORATION

( * ) Notice: Subject to any disclaimer, the term of this patent is extended or adjusted under 35 U.S.C. 154(b) by 107 days.

(21) Appl. No.: 16/139,400

(22) Filed: Sep. 24, 2018

(65) Prior Publication Data

US 2020/0095463 A1    Mar. 26, 2020

(51) Int. Cl.
| | |
|---|---|
| C09D 183/04 | (2006.01) |
| C09D 7/20 | (2018.01) |
| C09D 7/61 | (2018.01) |
| C09D 7/65 | (2018.01) |
| C08K 3/04 | (2006.01) |
| B60S 1/38 | (2006.01) |
| C08K 3/38 | (2006.01) |

(52) U.S. Cl.
CPC ............ *C09D 183/04* (2013.01); *C08K 3/042* (2017.05); *C09D 7/20* (2018.01); *C09D 7/61* (2018.01); *C09D 7/65* (2018.01); *B60S 1/38* (2013.01); *C08K 3/04* (2013.01); *C08K 3/38* (2013.01); *C08K 2003/385* (2013.01)

(58) Field of Classification Search
CPC .......... C09D 183/04; C08K 3/38; C08K 3/04; C08K 3/042; C08K 2003/382; C08K 2003/385; B60S 1/38
See application file for complete search history.

(56) References Cited

U.S. PATENT DOCUMENTS

| | | | |
|---|---|---|---|
| 8,258,219 B2 * | 9/2012 | Shimada | B60S 1/38 |
| | | | 524/261 |
| 9,428,710 B2 * | 8/2016 | Massaro, Jr. | C10M 161/00 |
| 2005/0192391 A1 * | 9/2005 | Pinter | C09D 5/024 |
| | | | 524/404 |
| 2014/0051613 A1 * | 2/2014 | Massaro, Jr. | C10M 173/02 |
| | | | 508/155 |

FOREIGN PATENT DOCUMENTS

| | | | |
|---|---|---|---|
| JP | 10001640 A | * | 1/1998 |
| JP | 2000190821 A | * | 7/2000 |
| KR | 20020091721 | | 10/2003 |
| KR | 20130132181 A | * | 12/2013 |

OTHER PUBLICATIONS

Google translation of KR 20130132181 (2013, 10 pages).*
Machine translated English language equivalent of JP Application No. 2000-006012, which is the same as JP Publication 2000190821 (2000, 73 pages).*
Machine translated English language equivalent of JP 10001640 (1998, 13 pages).*

* cited by examiner

*Primary Examiner* — Brieann R Johnston
(74) *Attorney, Agent, or Firm* — Grossman, Tucker, Perreault & Pfleger, PLLC

(57) ABSTRACT

This disclosure relates to a coating composition for a silicone wiper blade and a rubber wiper blade using the same. More particularly, this disclosure relates to a coating composition for a silicone rubber wiper blade which has excellent wiping durability and water-repellent properties, and a silicone rubber wiper blade which does not require a chlorine surface treatment process using the coating composition for a silicone rubber wiper blade.

18 Claims, No Drawings

COATING COMPOSITION FOR A SILICONE RUBBER WIPER BLADE AND SILICONE RUBBER WIPER BLADE USING THE SAME

FIELD

This disclosure relates to a coating composition for a silicone rubber wiper blade and a silicone rubber wiper blade using the same. More particularly, this disclosure relates to a coating composition for a silicone rubber wiper blade which has excellent wiping durability and water-repellent properties, and a silicone rubber wiper blade which does not require a chlorine surface treatment process by using the coating composition for a silicone rubber wiper blade.

DESCRIPTION OF RELATED ART

Wipers are used to remove water and debris from smooth surfaces of glasses, etc. of industrial machineries such as vehicles, aircraft, ships, and the like.

A wiper blade rubber is mounted on the sliding portion of the wiper. For example, in a windshield (windscreen) wiper for an automobile, rain, snow, dust, mud, and the like attached to the glass surface are removed by the operation of the wiper blade rubber as the wiper is driven. As a base material of the wiper blade rubber, a resin elastomer or the like is used in addition to a rubber material, but a rubber material is generally used.

In recent years, glass is sometimes subjected to a water-repellent treatment with a siloxane compound or the like in order to secure clear view on a windshield of an automobile or the like. When the water-repellent treatment is performed, the water becomes spherical and deviates from the glass surface. Since the water film is not formed on the glass, the contact area between the glass and the wiper blade rubber is increased to increase the coefficient of friction. As a result, chattering and noise can occur. Further, since water-repellent wax of an automatic car-washer adheres to the windshield to form an oil film, it is difficult to form a water film on the surface of the glass as described above and thus chattering and noise can easily occur.

The wiper blade rubber is worn by friction and foreign materials such as sand when used for a long time. This may interfere driving due to chattering, noises, and marks after cleaning caused by the torn rubber.

Accordingly, various wiper blade rubbers and lubricants coating the same have been developed.

Korean Patent Publication No. 2002-0091721 discloses a wiper blade lubrication coating composition comprising silicone rubber powder and silicone powder obtained by pulverizing three dimensionally bonded siloxane.

SUMMARY

An object of this disclosure is to provide a coating composition for a silicone rubber wiper blade having excellent wiping off durability and excellent water-repellency.

Another object of this disclosure is to provide a water-repellent silicone rubber wiper blade prepared by using the coating composition for a silicone rubber wiper blade which does not require a chlorine surface treatment process.

Further another object of this disclosure is to provide a method for a silicone rubber wiper blade having excellent wiping off durability and excellent water-repellency.

According to an aspect, there is provided a coating composition for a silicone rubber wiper blade comprising: an organic solvent 65-80 wt. %; a binder 5-15 wt. %; a solid lubricant 15-18 wt. %; and an additive 1-5 wt. %, wherein the solid lubricant comprises boron nitride in an amount of 33-83 wt. % based on 100 wt. % of the solid lubricant.

According to an embodiment, the organic solvent may comprise 170-200 wt. % of methylethylketone based on 500 wt. % of toluene.

According to an embodiment, the solid lubricant may comprise 80 to 83 wt. % of boron nitride based on 100 wt. % of the solid lubricant.

According to an embodiment, the solid lubricant may further comprise graphite and thus may comprise boron nitride 33-44 wt. % and graphite 38-46 wt. % based on 100 wt. % of the solid lubricant.

According to an embodiment, continuous oil bleeding of the silicone rubber wiper blade may improve water repellency and/or wiping durability.

According to an embodiment, chattering of the water repellent surface of the silicone rubber wiper blade may be improved.

According to an embodiment, wiping durability of the silicone rubber wiper blade may be improved.

According to an embodiment, coloring of the silicone rubber wiper blade may be possible.

According to another aspect, there is provided a silicone rubber wiper blade coated with the coating composition for a silicone rubber wiper blade described above.

According to further another aspect, there is provided a method for preparing a silicone rubber wiper blade comprising coating with the coating composition for a silicone rubber wiper blade on the silicone rubber wiper blade.

According to an embodiment, there is provided a water-repellent coating composition for a silicone rubber wiper blade having improved chattering of water-repellent surface.

According to an embodiment, there is provided a water-repellent coating composition for a silicone rubber wiper blade having improved wiping durability.

According to an embodiment, there is provided a silicone rubber wiper blade having improved water-repellency and/or wiping durability with continuous oil bleeding.

According to an embodiment, there is provided a silicone rubber wiper blade capable of coloring.

According to an embodiment, there is provided a method for manufacturing a wiper blade which can simplify the manufacturing process by not requiring a chlorine surface treatment.

Other objects and features of this disclosure will become more apparent from the following detailed description, the drawings, and the claims.

DETAILED DESCRIPTION

While the present disclosure has been described with reference to particular embodiments, it is to be appreciated that various changes and modifications may be made by those skilled in the art without departing from the spirit and scope of the present disclosure, as defined by the appended claims and their equivalents. Throughout the description of the present disclosure, when describing a certain technology is determined to evade the point of the present disclosure, the pertinent detailed description will be omitted.

In order that the invention may be more readily understood, certain terms are first defined here for convenience. Unless otherwise defined herein, the scientific and technical terms used in this disclosure will have the meaning generally understood by those who are skilled in the art. As used herein, the term 'comprising' does not exclude other elements unless specifically stated otherwise but may include other elements.

According to an aspect, there is provided a coating composition for a silicone rubber wiper blade comprising: an organic solvent 65-80 wt. %; a binder 5-15 wt. %; a solid lubricant 15-18 wt. %; and an additive 1-5 wt. %, wherein the solid lubricant comprises boron nitride in an amount of 33-83 wt. % based on 100 wt. % of the solid lubricant.

As long as the organic solvent can dissolve the binder, there is no particular limitation and a known organic solvent can be used. Examples of the organic solvent may include methylethylketone, toluene, xylene, ethyl acetate, butyl acetate, ethanol, and a mixture thereof. However, it is not limited thereto. The organic solvent may be used in an amount of 65-85 wt. %, preferably 67-70 wt. % in the coating composition to improve water-repellency and/or wiping off durability properties of the wiper blade.

The organic solvent may include 170-200 wt. % of methylethylketone based on 500 wt. % of toluene to further improve water-repellency and/or wiping off durability properties of the wiper blade.

The coating composition reduces a coefficient of friction of the binder itself by using a binder exhibiting proper elasticity and extensibility and achieves both low friction and abrasion resistance by minimizing the addition amount of the solid lubricant.

However, if the binder is used more than 15 wt. % of the coating composition, it may cause stripe marks or noises after wiping with the wiper blade. In addition, since the solid lubricant is used with relatively lower amount, the friction coefficient may be rapidly increased and the sliding property may be deteriorated when sand is attached to the wiper blade.

Examples of the binder may include a polyester polyol resin, a polyether polyol resin, a polyurethane resin, a silicone modified urethane resin, a fluoroolefin resin, a polyvinylidene difluoride resin, a tetrafluoroethylene resin, a hexafluoropropylene resin, a vinylidene fluoride resin, an epoxy resin, a urethane modified epoxy resin, a silicone modified epoxy resin, a ether resin, a silicone resin, an alkyl-modified silicone resin, a phenyl-modified silicone resin, a fluorine-modified silicone resin, a modified polysilicon resin, an acrylic resin, an acrylic polyol resin, a silicone modified acrylic resin, a methylmethacrylate-butadiene copolymer, an acrylonitrile-butadiene copolymer, a styrene-butadiene copolymer, a butadiene resin, a chloroprene latex, a urethane latex, and a room temperature curable silicone resin. However, it is not limited thereto.

The solid lubricant may be included in an amount of 15-18 wt. % of the coating composition to improve water-repellency and wiping durability properties of the wiper blade.

The solid lubricant including boron nitride may be included in an amount of 16-18 wt. % of the coating composition.

The solid lubricant may include boron nitride to improve water-repellency and/or wiping durability properties of the wiper blade. Further, when boron nitride is used as the solid lubricant, it may allow coloring of the wiper blade.

Boron nitride (BN) has a crystal structure similar to that of pyrolytic carbon and has excellent oxidation resistance. When oxidation proceeds, boron oxide ($B_2O_3$) is formed. The boron oxide formed has a self-healing function which is known as the most appropriate method for the interface control coating.

Boron nitride is called as white graphite, has excellent machinability, and has chemical and physical properties similar to those of graphite since it has a hexagonal structure similar to graphite. However, there is difference between the two materials since boron nitride is an excellent white insulator and graphite is an electrically conductive material.

The hexagonal boron nitride (h-BN) powder has a flake-crystal structure and is used in a wide range of industrial fields because of its excellent lubrication at high temperature, releasability, electrical insulation, heat resistance and chemical stability.

In addition, boron nitride may be preferably used alone as a main component since boron nitride has a hexagonal structure and dose not loose lubricity even when it is in contact with water, in view of the use of wiper blades that change from a dry state to a wet state. Boron nitride may be used alone as a main component, or may be also used in combination of two or more if it satisfies the performance.

Boron nitride may be used alone as a main component in amount of 80-83 wt. % based on 100 wt. % of the solid lubricant. However, it is not limited thereto. When the amount of boron nitride in the solid lubricant is less than 80 wt. %, it may not provide lubricity. On the other hand, when the amount of boron nitride in the solid lubricant is more than 83 wt. %, strength of the coating film of the wiper blade may be lowered and lubricating durability may be thus deteriorated.

The solid lubricant may further include at least one selected from molybdenum disulfide ($MoS_2$), polytetrafluoroethylene (PTFE), graphite, nylon resin, silicone resin powder, silicone rubber powder, hybrid silicone powder, and polyethylene resin in addition to boron nitride.

According to an embodiment, the solid lubricant may further include graphite. The solid lubricant may be preferable to include 33-44 wt. % of boron nitride and 38-46 wt. % of graphite based on 100 wt. % of solid lubricant to improve water-repellency and/or wiping durability properties of the wiper blade.

The additive may be an additive such as a dispersing agent, a defoaming agent, a leveling agent, an emulsifier, an ultraviolet absorber, an anti-settling agent and a filler such as kaolin, talc, silica, calcium carbonate, mica, titanium dioxide, alumina, urethane rubber powder, acrylic powder and the like. 1-5 wt. % Of a dispersing agent and an anti-settling agent in the additive may be used to improve water-repellency and/or wiping durability properties of the wiper blade.

Further, a silicone rubber-based composition may be used, and examples thereof may include dimethyl silicone raw rubber, methylphenyl vinyl silicone raw rubber, methylvinyl silicone raw rubber, fluorine silicone raw rubber and the like. It may be used alone or in combination of two or more if it provides adhesion to the wiper blade rubber and extensibility of rubber.

Although the method for preparing the coating composition for a silicone rubber wiper blade of this disclosure is not particularly limited, the binder may be dissolved and diluted with water or an organic solvent such as methylethylketone, toluene, xylene, butyl acetate or ethanol, and mixed and dispersed with silicone wax, silicone oil, solid lubricant, and additive in a homomixer. Here, the solvent, which dissolves and dilutes the binder, may be used alone or in combination of two or more to completely dissolve the binder.

According to an embodiment, continuous oil bleeding of the silicone rubber wiper blade may improve water-repellency and/or wiping durability properties of the silicone rubber wiper blade.

According to an embodiment, chattering of the water-repellent surface of the silicone rubber wiper blade may be improved.

According to an embodiment, wiping durability of the silicone rubber wiper blade may be improved.

According to an embodiment, coloring of the silicone rubber wiper blade may be possible.

According to another aspect, there is provided a silicone rubber wiper blade coated with the coating composition for a silicone rubber wiper blade described herein.

According to further another aspect, there is provided a method for preparing a silicone rubber wiper blade comprising coating with the coating composition for a silicone rubber wiper blade described herein on the silicone rubber wiper blade.

The silicone rubber wiper blade of this disclosure is manufactured by coating the coating composition for a silicone rubber wiper blade on the rib portion of the silicone rubber wiper blade.

The silicone rubber wiper blade according to this disclosure is characterized by remarkably improved water-repellency and/or wiping durability.

The method for preparing the silicone rubber wiper blade may be simplified by eliminating a chlorine surface treatment process.

Hereinafter, although more detailed descriptions will be given by examples, those are only for explanation and there is no intention to limit the disclosure.

Comparative Examples 1 to 6

130 wt. % Of modified polysilicon resin was dissolved and diluted with a solvent mixture composed of 500 wt. % of toluene and 150, 160, 210, 220, 230, and 250 wt. % of methylethylketone. The resulting solution was mixed and dispersed with no graphite and 70, 75, 77, 79, 84, and 85 wt. % of boron nitride, 10 wt. % of PE powder, 10 wt. % of silicon resin powder, 10 wt. % of silicone rubber powder and 20 wt. % of additive based on 100 wt. % of solid lubricant to provide a coating composition (see Table 1).

Comparative Examples 7 to 9

100 wt. % of modified polysilicon resin was dissolved and diluted with a solvent mixture composed of 510 wt. % to 550 wt. % of toluene and 190 wt. % to 210 wt. % of methylethylketone. The resulting solution was mixed and dispersed with no boron nitride and 75 wt. % to 83 wt. % of graphite, 10 wt. % of PE powder, 10 wt. % of silicone resin powder, 10 wt. % of silicone rubber powder and 20 wt. % of additive based on 100 wt. % of solid lubricant to provide a coating composition (see Table 1).

Examples 1 to 4

A coating composition was prepared in the same manner as the Comparative Examples 1 to 7. 80 to 83 wt. % Of boron nitride was used based on 100 wt. % of the solid lubricant and graphite was not used for the solid lubricant, and the amounts and types of the solid lubricant were used as shown in Table 1 below.

The units of the amounts of the components shown in Table 1 are wt. %.

The resulting coating compositions were applied as in Comparative Examples 1 to 9, thus obtaining wiper blades.

TABLE 1

| | Category | Comp. Ex. 1 | Comp. Ex. 2 | Comp. Ex. 3 | Comp. Ex. 4 | Ex. 1 | Ex. 2 | Ex. 3 | Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|---|---|---|
| binder | Modified polysilicon resin | 130 | 130 | 130 | 130 | 130 | 130 | 130 | 130 | 130 | 130 | 100 | 100 | 100 |
| organic solvent | Toluene | 500 | 500 | 500 | 500 | 500 | 500 | 500 | 500 | 500 | 500 | 550 | 530 | 510 |
| | Methylethylketone | 250 | 230 | 220 | 210 | 200 | 190 | 180 | 170 | 160 | 150 | 210 | 200 | 190 |
| solid lubricant | Graphite | 0 | 0 | 0 | 0 | 0 | 0 | 0 | 0 | 0 | 0 | 90 | 120 | 150 |
| | Boron nitride | 70 | 90 | 100 | 110 | 120 | 130 | 140 | 150 | 160 | 170 | 0 | 0 | 0 |
| | PE Powder | 10 | 10 | 10 | 10 | 10 | 10 | 10 | 10 | 10 | 10 | 10 | 10 | 10 |
| | Silicone resin powder | 10 | 10 | 10 | 10 | 10 | 10 | 10 | 10 | 10 | 10 | 10 | 10 | 10 |
| | Silicone rubber powder | 10 | 10 | 10 | 10 | 10 | 10 | 10 | 10 | 10 | 10 | 10 | 10 | 10 |
| additive | Anti-settling agent, Dispersing agent | 20 | 20 | 20 | 20 | 20 | 20 | 20 | 20 | 20 | 20 | 20 | 20 | 20 |
| | Total | 1000 | 1000 | 1000 | 1000 | 1000 | 1000 | 1000 | 1000 | 1000 | 1000 | 1000 | 1000 | 1000 |

Comparative Examples 10 to 15

130 wt. % of modified polysilicon resin was dissolved and diluted with a solvent mixture composed of 500 wt. % of toluene and 150, 160, 210, 220, 230, and 250 wt. % of methylethylketone. The resulting solution was mixed and dispersed with boron nitride and graphite with the amount shown in Table 2, 10 wt. % of PE powder, 10 wt. % of silicone resin powder, 10 wt. % of silicone rubber powder and 20 wt. % of additive based on 100 wt. % of solid lubricant to provide a coating composition.

Examples 5 to 8

130 wt. % of modified polysilicon resin was dissolved and diluted with a solvent mixture composed of 500 wt. % of toluene and 170 to 200 wt. % of methylethylketone. The resulting solution was mixed and dispersed with 33 to 44 wt. % of boron nitride and 38 to 46 wt. % of graphite, 10 wt. % of PE powder, 10 wt. % of silicone resin powder, 10 wt. % of silicone rubber powder and 20 wt. % of additive based on 100 wt. % of solid lubricant to provide a coating composition.

TABLE 2

| | Category | Comp. Ex. 10 | Comp. Ex. 11 | Comp. Ex. 12 | Comp. Ex. 13 | Ex. 5 | Ex. 6 | Ex. 7 | Ex. 8 | Comp. Ex. 14 | Comp. Ex. 15 | Comp. Ex. 7 |
|---|---|---|---|---|---|---|---|---|---|---|---|---|
| binder | Modified polysilicon resin | 130 | 130 | 130 | 130 | 130 | 130 | 130 | 130 | 130 | 130 | 100 |
| organic solvent | Toluene | 500 | 500 | 500 | 500 | 500 | 500 | 500 | 500 | 500 | 500 | 550 |
| | Methylethylketone | 250 | 230 | 220 | 210 | 200 | 190 | 180 | 170 | 160 | 150 | 210 |
| solid lubricant | Graphite | 70 | 70 | 70 | 70 | 70 | 70 | 70 | 70 | 70 | 70 | 90 |
| | Boron nitride | 0 | 20 | 30 | 40 | 50 | 60 | 70 | 80 | 90 | 100 | 0 |
| | PE Powder | 10 | 10 | 10 | 10 | 10 | 10 | 10 | 10 | 10 | 10 | 10 |
| | Silicone resin powder | 10 | 10 | 10 | 10 | 10 | 10 | 10 | 10 | 10 | 10 | 10 |
| | Silicone rubber powder | 10 | 10 | 10 | 10 | 10 | 10 | 10 | 10 | 10 | 10 | 10 |
| additive | Anti-settling agent, Dispersing agent | 20 | 20 | 20 | 20 | 20 | 20 | 20 | 20 | 20 | 20 | 20 |
| | Total | 1000 | 1000 | 1000 | 1000 | 1000 | 1000 | 1000 | 1000 | 1000 | 1000 | 1000 |

Test for Chattering of the Water-Repellent Surface

A water repellent was uniformly applied over the entire surface of an actual vehicle or a test buck under similar conditions at room temperature. The water repellent agent was RAIN OK (made in Korea), RAIN X (made in USA) and SOFT 99 (made in Japan). The entire surface was wiped with a dry cloth for 5 minutes and with a wet cloth for 5 minutes, then dried for at least 1 hour and the test evaluation was started. Contact pressure and attack angle of the blade arm were evaluated by applying Drawing Regulation Value and simultaneously operating the driver's windshield and the passenger's windshield. The evaluation conditions were as follows.

Evaluated while operating for 15 minutes at 13.5 voltage low speed operation and wet condition.

Evaluated while operating for 15 minutes at 10.0 voltage low speed operation and wet condition.

It was recorded as satisfaction when operation performance of water-repellent surface was at least 3 points (see Table 3).

TABLE 3

| | |
|---|---|
| 5 | No chattering and no noise<br>No complaints at all |
| 4 | Blade flipping forward/backward or very fine chattering of blade<br>No noise, Almost no complaints |
| 3 | Very fine chattering but good wipe-out<br>No noise, Complaints only from sensitive customers |
| 2 | Chattering and noise observed<br>Complaints from most customers |
| 1 | Severe chattering and noise<br>Complaints from all customers |

Test for Wiping Durability

Using a tester based on a tester used for evaluating the performance of wiper blades as prescribed in JIS D5710, after the wiper blades obtained in Examples and Comparative Examples were operated for 15 min in an anhydrous state, water repellency of the front windshield was determined. Water was uniformly sprayed at 500 cc/min and then the wiper blades were operated for 500 thousand cycles. The operating speed of the wiper blades was set at 40 cycles/min. The evaluation was carried whether there was wiping out and noise at operation of 100 thousand, 300 thousand, and 500 thousand cycles. Wiping out was determined when the wiper blade was closed. In the case where the chattering of the wiper blades was increased and the wiper blades did not operated efficiently, the test was stopped. The evaluation reference table for wiping durability is as in Table 4.

TABLE 4

Evaluation Reference Table for Initial Wiping Performance

| Blade Wiped State | Grade | Range | Condition | No. of lines | Wiped lines |
|---|---|---|---|---|---|
| | 10 | — | — | — | — |
| | 9 | 1/6 L | Discontinuous | 1 | Very fine lines ≤ 0.3 mm |
| | 8 | 1/6 L | Discontinuous | Max. 3 | Very fine lines ≤ 0.3 mm |
| | | 1/6 L | continuous | 1 | Very fine lines ≤ 0.3 mm |
| | 7 | 1/6 L | continuous | Max. 3 | Very fine lines ≤ 0.3 mm |
| | | 2/3 L | Discontinuous | 1 | Very fine lines ≤ 0.3 mm |
| | 6 | 1/6 L | continuous | Max. 4 | Very fine lines ≤ 0.1 mm |
| | | 1/6 L And 2/3 L | Discontinuous | Max. 12 | Very fine lines ≤ 0.3 mm |

TABLE 4-continued

Evaluation Reference Table for Initial Wiping Performance

| Blade Wiped State | Grade | Range | Condition | No. of lines | Wiped lines |
|---|---|---|---|---|---|
|  | 5 | ⅔ L | continuous | 1 | Very fine lines ≤ 0.3 mm |
|  |  | ⅙ L | continuous | Max. 6 | Very fine lines ≤ 0.1 mm |
|  |  | ⅙ L And ⅔ L | Discontinuous | Max. 20 | Very fine lines ≤ 0.3 mm |
|  | 4 | ⅔ L | continuous | Max. 2 | Very fine lines ≤ 0.3 mm |
|  |  | ⅙ L And ⅔ L | continuous | Many | Even stripes with various widths, Over 75% wiped of the entire area |
|  | 3 | ⅙ L And ⅔ L | continuous | Many | Grade 4 type lines, ⅔ L concentrated and less than 75% wiped |
|  | 2 | ⅙ L And ⅔ L | continuous | — | Evidence of a water film |
|  |  | ⅙ L And ⅔ L | continuous | — | Marks due to blade and elements |
|  |  | ⅙ L And ⅔ L | continuous | — | Hazing formed |
|  | 1 | ⅙ L And ⅔ L | continuous | — | Evidence of chatter |

In addition, the wiper blades obtained in Examples and Comparative Examples were tested for chattering of the water-repellent surface and wiping out durability. The result is summarized in Table 5.

TABLE 5

| Catagory | Comp. Ex. 1 | Comp. Ex. 2 | Comp. Ex. 3 | Comp. Ex. 4 | Ex. 1 | Ex. 2 | Ex. 3 | Ex. 4 | Comp. Ex. 5 | Comp. Ex. 6 | Comp. Ex. 7 | Comp. Ex. 8 |
|---|---|---|---|---|---|---|---|---|---|---|---|---|
| Chattering grade of the water-repellent surface | 3 | 3 | 3.5 | 3.5 | 4 | 4.5 | 4.5 | 4 | 3.5 | 3 | 3 | 3 |
| Wiping durability grade (200,000 times) | 5/4* | 6/5 | 6/6 | 6/7 | 7/8 | 8/9 | 8/9 | 8/8 | 6/7 | 5/6 | 6/7 | 7/6 |

| Catagory | Comp. Ex. 9 | Comp. Ex. 10 | Comp. Ex. 11 | Comp. Ex. 12 | Comp. Ex. 13 | Ex. 5 | Ex. 6 | Ex. 7 | Ex. 8 | Comp. Ex. 14 | Comp. Ex. 15 |
|---|---|---|---|---|---|---|---|---|---|---|---|
| Chattering grade of the water-repellent surface | 2 | 3 | 3 | 3.5 | 3.5 | 4 | 4.5 | 4.5 | 4 | 3.5 | 3 |
| Wiping durability grade (200,000 times) | 6/7 | 6/6 | 6/6 | 6/7 | 7/7 | 7/8 | 8/8 | 8/8 | 8/8 | 7/7 | 6/6 |

*"/" indicates Open/Close when indicating the degree of wiping durability. Open indicates when the wiper blade is moved upward from the fixed position, and Close indicates when the wiper blade returns to its original position.

As shown in Table 5, grades for chattering of the water-repellent surfaces of the wiper blades of Examples 1 to 4 including 80 to 83 wt. % of boron nitride based on 100 wt. % of the solid lubricant were in the range of 4 to 4.5 which were better than those of Comparative Examples 1 to 9.

In addition, the wiping-out durability grades (200,000 cycles) of the wiper blades of Examples 1 to 4 including 80 to 83 wt. % of boron nitride based on 100 wt. % of the solid lubricant were in the range of 7/8 to 8/9 which were better than those of Comparative Examples 1 to 9.

On the other hand, when boron nitride is used in an amount of less than 80 wt. % or more than 83 wt. % based on 100 wt. % of the solid lubricant, chattering of the water-repellent surface and wiping durability were deteriorated.

As shown in Table 5, grades for chattering of the water-repellent surfaces of the wiper blades of Examples 5 to 8 including 33 to 44 wt. % of boron nitride and 38 to 46 wt. % of graphite based on 100 wt. % of the solid lubricant were in the range of 4 to 4.5 which were better than those of Comparative Examples 10 to 15.

In addition, the wiping durability grades (200,000 cycles) of the wiper blades of Examples 5 to 8 including 33 to 44 wt. % of boron nitride and 38 to 46 wt. % of graphite based on 100 wt. % of the solid lubricant were in the range of 7/8 to 8/8 which were better than those of Comparative Examples 10 to 15.

On the other hand, when boron nitride is used in an amount of less than 33 wt. % or more than 44 wt. % chattering of the water-repellent surface and wiping durability were deteriorated. When graphite is used in an amount of less than 38 wt. % or more than 46 wt. % based on 100 wt. % of the solid lubricant, chattering of the water-repellent surface and wiping durability were also deteriorated.

Test for Water Drop Contact Angle

A wiper blade was coated with CAP RISI0 (CAP Co., Ltd.) of Comparative Example 16 using a conventional glass coating (G coating). Another wiper blade was coated with a water-repellent coating composition for a silicone rubber wiper blade of Example 7. Properties of initial water-repellency, water-repellent durability, water drop contact angle, initial wiping performance, and wiping durability were determined. The results are summarized in Table 6.

TABLE 6

| Category | C. Ex. 16 | Ex. 7 |
| --- | --- | --- |
| Composition | NR, CR Rubber + G Coating(including water-repellent oil) | Silicon rubber (including water-repellent oil) + Special Coating |
| Initial water-repellency | 95% ↑ | 95% ↑ |
| Water-repellent durability after 50,000 times of operation | 50% ↑ | 90% ↑ |
| Water drop contact angle | 80° ↑ | 70° ↑ |
| Initial wiping performance | 9 Pts ↑ | 9 Pts ↑ |
| Wiping durability after 100,000 times of operation | 6 Pts ↑ | 8 Pts ↑ |

As shown in Table 6, initial water repellency and water-repellent durability of Example 7 were 95% and 90%, respectively, which were superior to those of Comparative Example 16. In addition, grade for wiping durability after 100,000 cycles of Example 7 was 8, which was superior to that of Comparative Example 16.

What is claimed is:

1. A coating composition for a silicone rubber wiper blade comprising:
    an organic solvent 65-80 wt. %;
    a binder 5-15 wt. %;
    a solid lubricant 15-18 wt. %; and
    an additive 1-5 wt. % based on the total weight of the coating composition;
    wherein the organic solvent comprises toluene and methylethylketone, wherein the methylethylketone is included in an amount of 17-20 wt. % based on the total weight of the coating composition,
    wherein the solid lubricant comprises a mixture of two or more solid lubricants, and wherein the solid lubricant further comprises boron nitride in an amount of 5 to 15 wt. % based on the total weight of the coating composition.

2. The coating composition for a silicone rubber wiper blade of claim 1, wherein the solid lubricant comprises boron nitride in an amount of 12 to 15 wt. % based on the total weight of the coating composition.

3. The coating composition for a silicone rubber wiper blade of claim 1, wherein the solid lubricant comprises boron nitride 33-44 wt. % and graphite 38-46 wt. % based on 100 wt. % of the solid lubricant.

4. The coating composition for a silicone rubber wiper blade of claim 1, wherein the coating composition induce a continuous oil bleeding of the silicone rubber wiper blade including water-repellent oil which improves water-repellency and wiping durability of the silicone rubber wiper blade compared with the same silicone wiper blade that is uncoated.

5. The coating composition for a silicone rubber wiper blade of claim 1, wherein chattering of the water-repellent surface of the silicone rubber wiper blade is improved compared with the same silicone wiper blade that is uncoated.

6. The coating composition for a silicone rubber wiper blade of claim 1, wherein wiping durability of the silicone rubber wiper blade is improved compared with the same silicone wiper blade that is uncoated.

7. The coating composition for a silicone rubber wiper blade of claim 1, wherein coloring of the silicone rubber wiper blade is improved compared with the same silicone wiper blade that is uncoated.

8. A silicone rubber wiper blade coated with the coating composition for a silicone rubber wiper blade of claim 1.

9. A method for preparing a silicone rubber wiper blade comprising coating with the coating composition for a silicone rubber wiper blade of claim 1 on the silicone rubber wiper blade.

10. A coating composition for a silicone rubber wiper blade comprising:
    an organic solvent 65-80 wt. %;
    a binder 5-15 wt. %;
    a solid lubricant 16-18 wt. %; and
    an additive 1-5 wt. % based on the total weight of the coating composition;
    wherein the organic solvent comprises toluene and methylethylketone, wherein the methylethylketone is included in an amount of 17-20 wt. % based on the total weight of the coating composition,
    wherein the solid lubricant comprises boron nitride in an amount of 5 to 15 wt. % based on the total weight of the coating composition.

11. The coating composition for a silicone rubber wiper blade of claim 10, wherein the solid lubricant comprises boron nitride in an amount of 12 to 15 wt. % based on the total weight of the coating composition.

12. The coating composition for a silicone rubber wiper blade of claim 10, wherein the solid lubricant comprises boron nitride 33-44 wt. % and graphite 38-46 wt. % based on 100 wt. % of the solid lubricant.

13. The coating composition for a silicone rubber wiper blade of claim 10, wherein the coating composition induce a continuous oil bleeding of the silicone rubber wiper blade including water-repellent oil which improves water-repellency and wiping durability of the silicone rubber wiper blade compared with the same silicone wiper blade that is uncoated.

14. The coating composition for a silicone rubber wiper blade of claim 10, wherein chattering of the water-repellent surface of the silicone rubber wiper blade is improved compared with the same silicone wiper blade that is uncoated.

15. The coating composition for a silicone rubber wiper blade of claim 10, wherein wiping durability of the silicone rubber wiper blade is improved compared with the same silicone wiper blade that is uncoated.

16. The coating composition for a silicone rubber wiper blade of claim 10, wherein coloring of the silicone rubber wiper blade is improved compared with the same silicone wiper blade that is uncoated.

17. A silicone rubber wiper blade coated with the coating composition for a silicone rubber wiper blade of claim 10.

18. A method for preparing a silicone rubber wiper blade comprising coating with the coating composition for a silicone rubber wiper blade of claim 10 on the silicone rubber wiper blade.

* * * * *